US006136923A

United States Patent [19]
Cheung et al.

[11] Patent Number: 6,136,923
[45] Date of Patent: Oct. 24, 2000

[54] THERMOPLASTIC COMPOSITIONS OF INTERPOLYMERS OF ETHYLENE WITH STYRENE BLENDED WITH POLY VINYL CHLORIDE

[75] Inventors: Yunwa W. Cheung; Martin J. Guest, both of Lake Jackson, Tex.

[73] Assignee: The Dow Chemical Company, Midland, Mich.

[21] Appl. No.: 08/950,983

[22] Filed: Oct. 15, 1997

[51] Int. Cl.[7] ............................. C08L 27/06; C08L 25/08; C08K 5/10; C08K 5/521
[52] U.S. Cl. ...................... 525/214; 524/130; 524/132; 524/296; 524/297; 524/298; 524/306; 524/378; 524/527
[58] Field of Search ................................. 525/239, 214; 524/297, 130, 132, 296, 298, 306, 378, 527

[56] References Cited

U.S. PATENT DOCUMENTS

| | | | |
|---|---|---|---|
| 4,627,993 | 12/1986 | Loomis | 524/297 |
| 5,244,996 | 9/1993 | Kawaski et al. | 526/347 |
| 5,380,810 | 1/1995 | Lai et al. | 526/352 |
| 5,460,818 | 10/1995 | Park et al. | 426/415 |
| 5,576,374 | 11/1996 | Betso et al. | 525/239 |
| 5,688,866 | 11/1997 | Silvis et al. | 525/239 |
| 5,739,200 | 4/1998 | Cheung et al. | 524/296 |

FOREIGN PATENT DOCUMENTS

| | | | |
|---|---|---|---|
| 0 416 815 | 3/1991 | European Pat. Off. | C08F 10/00 |
| 7/278230 | 10/1995 | Japan | C08F 210/02 |
| 94/00500 | 1/1994 | WIPO | C08F 10/00 |
| 95/27755 | 10/1995 | WIPO | C08L 25/08 |
| 95/32095 | 11/1995 | WIPO | B32B 27/32 |
| 98/10015 | 3/1998 | WIPO | C08L 23/02 |
| 98/27156 | 6/1998 | WIPO | C08L 25/08 |

OTHER PUBLICATIONS

Derwent Abstract 95/401001/51, Translation of JP 07/278230*.
Cheung, Y. W. et al., Proc. Antec '96, pp. 1634–1637.
Plastics Technology, p. 25, Sep. 1992.
Longo and Grassi, *Makromol Chem.*, vol. 191, pp. 2387–2396 (1990).
D'Anniello et al., *Journal of Applied Polymer Science*, vol. 58, pp. 1701–1706 (1995).
Xu and Lin, *Polymer Preprints, Am. Chem. Soc., Div., Poly. Chem.*, vol. 35, pp. 686–687 (1994).
Lu et al., *Journal of Applied Polymer Science*, vol. 53, pp. 1453–1460 (1994).
"Plasticizers", *Modern Plastics, Encyclopedia*, Mid Oct. 1988 Issue, vol. 65, No. 11, pp. 180–184, McGraw Hill, 1989).

*Primary Examiner*—Donald R. Wilson

[57] ABSTRACT

The present invention relates to blend compositions comprising;
(A) of from about 1 to about 99 weight percent based on the combined weights of Components A, B and C of at least one substantially random interpolymer; and wherein said interpolymer;
 (1) contains of from about 0.5 to about 65 mole percent of polymer units derived from;
  (a) at least one vinylidene aromatic monomer, or
  (b) at least one hindered aliphatic vinylidene monomer, or
  (c) a combination of at least one vinylidene aromatic monomer and at least one hindered aliphatic vinylidene monomer;
 (2) contains of from about 35 to about 99.5 mole percent of polymer units derived from at least one aliphatic α-olefin having from 2 to 20 carbon atoms;
 (3) has a molecular weight (Mn) greater than about 1,000;
 (4) has a melt index ($I_2$) of from about 0.01 to about 1,000;
 (5) has a molecular weight distribution ($M_w/M_n$) of from about 1.5 to about 20; and
(B) of from about 99 to about 1 weight percent based on the combined weights of Components A, B, and C of one or more vinyl halide homopolymer(s) or copolymer (s); and
(C) of from about 0 to about 70 weight percent based on the combined weights of Components A, B, and C of one or more plasticizers. The novel blend compositions, provide materials with improved processing/property attributes over the unmodified polymers comprising the blends. The blend compositions can exhibit a unique balance of properties including enhanced modulus and barrier properties, improved tensile strength, radio frequency (rf) sealability, solvent bondability, thermal stability and heat resistance depending upon the selection of the individual blend components and their composition ratios. Additionally, the location and the breadth of the glass transition can be controlled by varying the blend composition and plasticizer level. Surprisingly blends including a plasticizer show a single phase material from glass transition temperature data analysis.

16 Claims, No Drawings

THERMOPLASTIC COMPOSITIONS OF INTERPOLYMERS OF ETHYLENE WITH STYRENE BLENDED WITH POLY VINYL CHLORIDE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

This invention relates to thermoplastic compositions of interpolymers of α-olefin monomers with one or more vinylidene aromatic monomers and/or one or more hindered aliphatic or cycloaliphatic vinylidene monomers blended with vinyl halide homopolymers and copolymers.

The generic class of materials of α-olefin/hindered vinylidene monomer substantially random interpolymers, including materials such as α-olefin/vinyl aromatic monomer interpolymers, and their preparation, are known in the art, such as described in EP 416 815 A2. These materials, such as ethylene/styrene interpolymers, offer a wide range of material structures and properties which makes them useful for varied applications, such as asphalt modifiers or as compatibilizers for blends of polyethylene and polystyrene, as described in U.S. Pat. No. 5,460,818.

The structure, thermal transitions and mechanical properties of substantially random interpolymers of ethylene and styrene containing up to about 50 mole percent styrene have been described (Y. W. Cheung, M. J. Guest; Proc. Antec '96, pages 1634–1637). These polymers are found to have glass transitions in the range −20° C. to ±35° C., and show no measurable crystallinity above about 25 mole percent styrene incorporation, i.e. they are essentially amorphous.

Although of utility in their own right, Industry is constantly seeking to improve the applicability of these interpolymers. To perform well in certain applications, these interpolymers could be desirably improved, for example, in the areas of processing characteristics or enhanced glass transition temperature depression or reduced modulus or reduced hardness or lower viscosity or improved ultimate elongation compared to a like property of the unmodified interpolymer. In relation to this invention, it is also considered advantageous to be able to engineer the glass transition process for materials comprising the interpolymers to a particular temperature range, so that the energy absorbing capabilities of the polymer can be best utilized, for example in sound and vibration damping. U.S. Pat. No. 5,739,200 filed Dec. 17, 1996 describes the improvement in properties of interpolymers of α-olefin/vinylidene aromatic monomers obtained by adding plasticizers.

Similarly the family of vinyl polymers such as poly (vinyl chloride) (PVC) have found applications in many markets, in part because of their versatility and good balance. This versatility is readily achieved due to the compatibility of the polymer with a range of plasticizers, typically employed at levels which improve flexibility and processability.

The use of polymeric materials to modify the impact properties of rigid PVC is widely known. For example, the addition of polyacrylic resins, butadiene-containing polymers such as acrylonitrile butadiene styrene terpolymers (ABS), and methacrylate butadiene styrene terpolymers (MBS), and chlorinated polyethylene (CPE) resins to rigid PVC is known to increase the impact strength of PVC products such as house siding panels, vinyl window frames, electrical conduit, and blow molded PVC bottles. Impact modifiers are typically used in these applications at from 5 to about 15 parts by weight per 100 parts of PVC resin. The rigid PVC resins typically used in these applications is typically classified as medium or high molecular weight.

In the case of impact modification of low molecular weight or flexible PVC resins, such as are used in injection molding applications, the melt viscosity of the impact modifying material is higher than that of the PVC resin. This fact can result in poor dispersion and broad particle size distribution of the impact modifier with the effect of the low PVC compounds having low impact strength. Some improvement in impact strength can be gained by increasing the amount of impact modifier in the compound but this is often economically counter-productive.

The purpose of this invention is to provide novel blend compositions comprising one or more vinyl halide polymers and at least one substantially random interpolymer of one or more α-olefin monomers with one or more vinylidene aromatic monomers and/or one or more hindered aliphatic or cycloaliphatic vinylidene monomers. The novel blend compositions, provide materials with improved processing/property attributes over the unmodified polymers comprising the blends. The blend compositions can exhibit a unique balance of properties including enhanced modulus and barrier properties, improved tensile strength, toughness, radio frequency (rf) sealability, solvent bondability, thermal stability, and ignition resistance, depending upon the selection of the individual blend components and their composition ratios.

As a further embodiment, the invention provides novel blend compositions comprising one or more vinyl halide polymers, and at least one substantially random interpolymer of one or more α-olefin monomers with one or more vinylidene aromatic monomers and/or one or more hindered aliphatic or cycloaliphatic vinylidene monomers in combination with one or more plasticizers. These blend compositions allow for the manufacture of materials for which the location and the breadth of the glass transition can be controlled by varying the blend component composition ratio and plasticizer level. Surprisingly certain blends including a plasticizer show a single glass transition temperature (Tg) from thermal analysis data. In other examples, the blend compositions show multiple Tg's, for example when the level of plasticizer is relatively low. Such blend compositions additionally find utility in applications such as sound management and vibration damping.

BRIEF SUMMARY OF THE INVENTION

The present invention relates to blend compositions comprising;
  (A) of from about 1 to about 99 weight percent based on the combined weights of Components A, B and C of at least one substantially random interpolymer; and wherein said interpolymer;
    (1) contains of from about 0.5 to about 65 mole percent of polymer units derived from;
      (a) at least one vinylidene aromatic monomer, or
      (b) at least one hindered aliphatic vinylidene monomer, or
      (c) a combination of at least one vinylidene aromatic monomer and at least one hindered aliphatic vinylidene monomer;

(2) contains of from about 35 to about 99.5 mole percent of polymer units derived from at least one aliphatic α-olefin having from 2 to 20 carbon atoms;

(3) has a molecular weight (Mn) greater than about 1,000;

(4) has a melt index ($I_2$) of from about 0.01 to about 1,000;

(5) has a molecular weight distribution ($M_w/M_n$) of from about 1.5 to about 20; and (B) of from about 99 to about 1 weight percent based on the combined weights of Components A, B, and C of one or more vinyl halide homopolymer(s) or copolymer(s); and (C) of from about 0 to about 70 weight percent based on the combined weights of Components A, B, and C of one or more plasticizers.

The compositions of the present invention, can be utilized to produce a wide range of fabricated articles such as, for example, calendered, cast and blown sheets and films and injection molded parts, and the like. The compositions of the present invention can further find utility in flexible molded goods, as layers in multilayer film structures, in applications such as automotive instrument panel skins, as construction materials such as sidings, in flooring systems, as coatings on substrates including polymers, paper, leather, cloth and inorganic building materials, as foams for heat, sound and vibration damping.

DETAILED DESCRIPTION OF THE INVENTION

Definitions

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The term "hydrocarbyl" as employed herein means any aliphatic, cycloaliphatic, aromatic, aryl substituted aliphatic, aryl substituted cycloaliphatic, aliphatic substituted aromatic, or aliphatic substituted cycloaliphatic groups.

The term "hydrocarbyloxy" means a hydrocarbyl group having an oxygen linkage between it and the carbon atom to which it is attached.

The term "copolymer" as employed herein means a polymer wherein at least two different monomers are polymerized to form the copolymer.

The term "interpolymer" is used herein to indicate a polymer wherein at least two different monomers are polymerized to make the interpolymer. This includes copolymers, terpolymers, etc.

The term "substantially random" in the substantially random interpolymer comprising an α-olefin and a vinylidene aromatic monomer or hindered aliphatic or cycloaliphatic vinylidene monomer as used herein means that the distribution of the monomers of said interpolymer can be described by the Bernoulli statistical model or by a first or second order Markovian statistical model, as described by J. C. Randall in *POLYMER SEQUENCE DETERMINATION, Carbon-13 NMR Method*, Academic Press New York, 1977, pp. 71–78. Preferably, the substantially random interpolymer comprising an α-olefin and a vinylidene aromatic monomer does not contain more than 15 percent of the total amount of vinylidene aromatic monomer in blocks of vinylidene aromatic monomer of more than 3 units. More preferably, the interpolymer was not characterized by a high degree of either isotacticity or syndiotacticity. This means that in the carbon$^{-13}$ NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

The Ethylene/Hindered Vinylidene Interpolymers

The substantially random α-olefin/vinylidene aromatic interpolymers blend components of the present invention include, but are not limited to interpolymers prepared by polymerizing one or more α-olefins with one or more vinylidene aromatic monomers and/or one or more hindered aliphatic or cycloaliphatic vinylidene monomers.

Suitable α-olefins include for example, α-olefins containing from 2 to about 20, preferably from 2 to about 12, more preferably from 2 to about 8 carbon atoms. Particularly suitable are ethylene, propylene, butene-1, 4-methyl-1-pentene, hexene-1 and octene-1. These α-olefins do not contain an aromatic moiety.

Suitable vinylidene aromatic monomers which can be employed to prepare the interpolymers include, for example, those represented by the following formula:

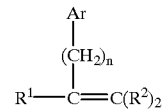

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to about 4, preferably from zero to 2, most preferably zero. Exemplary monovinylidene aromatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof. Preferred monomers include styrene, α-methyl styrene, the lower alkyl-($C_1$–$C_4$) or phenyl-ring substituted derivatives of styrene, such as for example, ortho-, meta-, and para-methylstyrene, the ring halogenated styrenes, para-vinyl toluene or mixtures thereof, and the like. A more preferred aromatic monovinylidene monomer is styrene.

By the term "hindered aliphatic or cycloaliphatic vinylidene compounds", it is meant addition polymerizable vinylidene monomers corresponding to the formula:

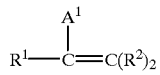

wherein $A^1$ is a sterically bulky, aliphatic or cycloaliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and $A^1$ together form a ring system. By the term "sterically bulky" is meant that the monomer bearing this substituent is normally incapable of addition polymerization by standard Ziegler-Natta polymerization catalysts at a rate comparable with ethylene polymerizations. Preferred hindered aliphatic or cycloaliphatic vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred hindered aliphatic or cycloaliphatic vinylidene compounds are the various isomeric vinyl-ring substituted derivatives of cyclohexene and substituted cyclohexenes, and 5-ethylidene-2-norbornene. Especially suitable are 1-, 3- and 4-vinylcyclohexene.

The substantially random interpolymers may be modified by typical grafting, hydrogenation, functionalizing, or other reactions well known to those skilled in the art. The polymers may be readily sulfonated or chlorinated to provide functionalized derivatives according to established techniques.

One method of preparation of the substantially random interpolymers is by polymerization of a mixture of polymerizable monomers in the presence of metallocene or constrained geometry catalysts and an activating cocatalyst.

The substantially random interpolymers can be prepared as described in U.S. application Ser. No. 545,403 filed Jul. 3, 1990 (corresponding to EP-A-0,416,815) by James C. Stevens et al., both of which are incorporated herein by reference in their entirety. Preferred operating conditions for such polymerization reactions are pressures from atmospheric up to 3000 atmospheres and temperatures from −30° C. to 200° C. Polymerizations and unreacted monomer removal at temperatures above the autopolymerization temperature of the respective monomers may result in formation of some amounts of homopolymer polymerization products for example the production of atactic polystyrene.

Examples of suitable catalysts and methods for preparing the substantially random interpolymers are disclosed in U.S. application Ser. No. 545,403, filed Jul. 3, 1990 (EP-A-416,815); U.S. application Ser. No. 702,475, filed May 20, 1991 now abandoned (EP-A-514,828); U.S. Pat. No. 5,721,185, filed May 5, 1992, (EP-A-520,732); U.S. Pat. No. 5,470,993, filed May 12, 1994; as well as U.S. Pat. Nos.: 5,055,438; 5,057,475; 5,096,867; 5,064,802; 5,132,380; 5,189,192; 5,321,106; 5,347,024; 5,350,723; 5,374,696; and 5,399,635 all of which patents and applications are incorporated herein by reference.

The substantially random α-olefin/vinylidene aromatic interpolymers can also be prepared by the methods described in JP 07/278230 employing compounds shown by the general formula

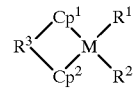

where $Cp^1$ and $Cp^2$ are cyclopentadienyl groups, indenyl groups, fluorenyl groups, or substituents of these, independently of each other; $R^1$ and $R^2$ are hydrogen atoms, halogen atoms, hydrocarbon groups with carbon numbers of 1–12, alkoxy groups, or aryloxy groups, independently of each other; M is a group IV metal, preferably Zr or Hf, most preferably Zr; and $R^3$ is an alkylene group or silanediyl group used to cross-link $Cp^1$ and $Cp^2$.

The substantially random α-olefin/vinylidene aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in *Plastics Technology*, p. 25 (September 1992), all of which are incorporated herein by reference in their entirety.

Also suitable are the substantially random interpolymers which comprise at least one α-olefin/vinyl aromatic/vinyl aromatic/α-olefin tetrad disclosed in U.S. application Ser. No. 08/708,869 filed Sep. 4, 1996 now abandoned by Francis J. Timmers et al. These interpolymers contain additional signals with intensities greater than three times the peak to peak noise. These signals appear in the chemical shift range 43.70–44.25 ppm and 38.0–38.5 ppm. Specifically, major peaks are observed at 44.1, 43.9 and 38.2 ppm. A proton test NMR experiment indicates that the signals in the chemical shift region 43.70–44.25 ppm are methine carbons and the signals in the region 38.0–38.5 ppm are methylene carbons.

It is believed that these new signals are due to sequences involving two head-to-tail vinyl aromatic monomer insertions preceded and followed by at least one α-olefin insertion, e.g. an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/vinyl aromatic monomer/ethylene tetrad will give rise to similar carbon$^{-13}$ NMR peaks but with slightly different chemical shifts.

These interpolymers are prepared by conducting the polymerization at temperatures of from about −30° C. to about 250° C. in the presence of such catalysts as those represented by the formula

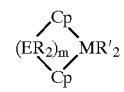

wherein: each Cp is independently, each occurrence, a substituted cyclopentadienyl group π-bound to M; E is C or Si; M is a group IV metal, preferably Zr or Hf, most preferably Zr; each R is independently, each occurrence, H, hydrocarbyl, silahydrocarbyl, or hydrocarbylsilyl, containing up to about 30 preferably from 1 to about 20 more preferably from 1 to about 10 carbon or silicon atoms; each R' is independently, each occurrence, H, halo, hydrocarbyl, hydrocarbyloxy, silahydrocarbyl, hydrocarbylsilyl containing up to about 30 preferably from 1 to about 20 more preferably from 1 to about 10 carbon or silicon atoms or two R' groups together can be a $C_{1-10}$ hydrocarbyl substituted 1,3-butadiene; m is 1 or 2; and optionally, but preferably in the presence of an activating cocatalyst. particularly, suitable substituted cyclopentadienyl groups include those illustrated by the formula:

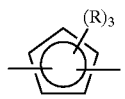

wherein each R is independently, each occurrence, H, hydrocarbyl, silahydrocarbyl, or hydrocarbylsilyl, containing up to about 30 preferably from 1 to about 20 more preferably from 1 to about 10 carbon or silicon atoms or two R groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanediyl)-bis-(2-methyl-4-phenylindenyl)zirconium dichloride, racemic-(dimethylsilanediyl)-bis-(2-methyl-4-phenylindenyl) zirconium 1,4-diphenyl-1,3-butadiene, racemic-(dimethylsilanediyl)-bis-(2-methyl-4-phenylindenyl) zirconium di-$C_{1-4}$ alkyl, racemic-(dimethylsilanediyl)-bis-(2-methyl-4-phenylindenyl) zirconium di-$C_{1-4}$ alkoxide, or any combination thereof and the like.

Further preparative methods for the substantially random α-olefin/vinylidene aromatic interpolymers blend components of the present invention have been described in the literature. Longo and Grassi (*Makromol. Chem.*, Volume 191, pages 2387 to 2396 [1990]) and D'Anniello et al. (Journal of Applied Polymer Science, Volume 58, pages 1701–1706 [1995]) reported the use of a catalytic system based on methylalumoxane (MAO) and cyclopentadienyltitanium trichloride ($CpTiCl_3$) to prepare an ethylene-styrene copolymer. Xu and Lin (*Polymer Preprints, Am. Chem. Soc. Div. Polym. Chem.*) Volume 35, pages 686,687 [1994]) have reported copolymerization using a $MgCl_2/TiCl_4/NdCl_3/Al(iBu)_3$ catalyst to give random copolymers of styrene and propylene. Lu et al (*Journal of Applied Polymer Science*, Volume 53, pages 1453 to 1460 [1994]) have described the copolymerization of ethylene and styrene using a $TiCl_4/NdCl_3/MgCl_2/Al(Et)_3$ catalyst. The manufacture of α-olefin/vinyl aromatic monomer interpolymers such as propylene/styrene and butene/styrene are described in U.S. Pat. No. 5,244,996, issued to Mitsui Petrochemical Industries Ltd. All the above methods disclosed for preparing the interpolymer component are incorporated herein by reference.

Also included as interpolymer blend components are $C_4$–$C_7$, isoolefin/para-alkylstyrene interpolymers which are random copolymers of a $C_4$ to $C_7$ isomonoolefin, such as isobutylene and a para-alkylstyrene comonomer, preferably para-methylstyrene containing at least about 80%, more preferably at least about 90% by weight of the para isomer. These interpolymers also include functionalized interpolymers wherein at least some of the alkyl substituent groups present in the styrene monomer units contain halogen or some other functional group incorporated by nucleophilic substitution of benzylic halogen with other groups such as alkoxide, phenoxide, carboxylate, thiolate, thioether, thiocarbamate, dithiocarbamate, thiourea, xanthate, cyanide, malonate, amine, amide, carbazole, phthalamide, maleimide, cyanate and mixtures thereof.

Preferred materials may be characterized as isobutylene interpolymers containing the following monomer units randomly spaced along the polymer chain: These functionalized isomonoolefin interpolymers and their method of preparation are more particularly disclosed in U.S. Pat. No. 5,162,445, the complete disclosure of which is incorporated herein by reference.

Most useful of such functionalized materials are elastomeric, random interpolymers of isobutylene and para-methylstyrene containing from about 0.5 to about 20 mole % para-methylstyrene wherein up to about 60 mole % of the methyl substituent groups present on the benzyl ring contain a bromine or chlorine atom, preferably a bromine atom. These polymers have a substantially homogeneous compositional distribution such that at least 95% by weight of the polymer has a para-alkylstyrene content within 10% of the average para-alkylstyrene content of the polymer. More preferred polymers are also characterized by a narrow molecular weight distribution ($M_w/M_n$) of less than about 5, more preferably less than about 2.5, a preferred viscosity average molecular weight in the range of from about 200,000 up to about 2,000,000, and a preferred number average molecular weight in the range of from about 25,000 to about 750,000, as determined by Gel Permeation Chromatography.

The interpolymers may be prepared by slurry polymerization of the monomer mixture using a Lewis Acid catalyst followed by halogenation, preferably bromination, in solution in the presence of halogen and a radical initiator such as heat and/or light and/or a chemical initiator.

Also preferred are brominated interpolymers which generally contain from about 0.1 to about 5 mole % of bromomethylgroups, most of which is monobromomethyl, with less than 0.05 mole % dibromomethyl substituents present in the copolymer. More preferred interpolymers contain from about 0.05 up to about 2.5 wt % of bromine based on the weight of the interpolymer, most preferably from about 0.05 to 0.75 wt % bromine, and are substantially free of ring halogen or halogen in the polymer backbone chain. These interpolymers, their method of preparation, their method of cure and graft or functionalized polymers derived therefrom are more particularly disclosed in the above referenced U.S. Pat. No. 5,162,445. Such interpolymers are commercially available from Exxon Chemical under the tradename Exxpro™ Speciality Elastomers.

Vinyl Halide Homopolymers and Copolymers

Vinyl halide homopolymers and copolymers are a group of resins which use as a building block the vinyl structure $CH_2=CXY$, where X is selected from the group consisting of F, Cl, Br, and I and Y is selected from the group consisting of F, Cl, Br, I and H.

The vinyl halide polymer component of the blends of the present invention include but are not limited to homopolymers and copolymers of vinyl halides with copolymerizable monomers such as α-olefins including but not limited to ethylene, propylene, vinyl esters of organic acids containing 1 to 18 carbon atoms, e.g. vinyl acetate, vinyl stearate and so forth; vinyl chloride, vinylidene chloride, symmetrical dichloroethylene; acrylonitrile, methacrylonitrile; alkyl acrylate esters in which the alkyl group contains 1 to 8 carbon atoms, e.g. methyl acrylate and butyl acrylate; the corresponding alkyl methacrylate esters; dialkyl esters of dibasic organic acids in which the alkyl groups contain 1–8 carbon atoms, e.g. dibutyl fumarate, diethyl maleate, and so forth.

Preferably the vinyl halide polymers are homopolymers or copolymers of vinyl chloride or vinylidene chloride. Poly (vinyl chloride) polymers (PVC) can be further classified into two main types by their degree of rigidity. These are "rigid" PVC and "flexible" PVC. Flexible PVC is distinguished from rigid PVC primarily by the presence of and amount of plasticizers in the resin. Flexible PVC typically has improved processability, lower tensile strength and higher elongation than rigid PVC.

Of the vinylidene chloride homopolymers and copolymers (PVDC), typically the copolymers with vinyl chloride, acrylates or nitriles are used commercially and are most preferred. The choice of the comonomer significantly affects the properties of the resulting polymer. Perhaps the most notable properties of the various PVDC's are their low permeability to gases and liquids, barrier properties; and chemical resistance.

Also included are the various PVC and PVCD formulations containing minor amounts of other materials present to modify the properties of the PVC or PVCD, including but not limited to polystyrene, styrenic copolymers, polyolefins including homo and copolymers comprising polyethylene, and or polypropylene, and other ethylene/α-olefin copolymers, polyacrylic resins, butadiene-containing polymers such as acrylonitrile butadiene styrene terpolymers (ABS), and methacrylate butadiene styrene terpolymers (MBS), and chlorinated polyethylene (CPE) resins and the like.

Also included in the family of vinyl halide polymers for use as blend components of the present invention are the chlorinated derivatives of PVC typically prepared by post chlorination of the base resin and known as chlorinated PVC, (CPVC). Although CPVC is based on PVC and shares some of its characteristic properties, CPVC is a unique polymer having a much higher melt temperature range (410–450° C.) and a higher glass transition temperature (239–275° F.) than PVC.

Plasticizers

There is a broad knowledge base on the plasticization of PVC, and it is generally known that many thermoplastics can be plasticized. Reference can be made for example to "Plasticizers" in *Modern Plastics Encyclopedia*, Mid October 1988 Issue, Volume 65, No. 11, pages 180–184, McGraw Hill, 1989) regarding aspects of this type of technology. Depending upon the polymer type, typical plasticizer families include phosphoric acid derivatives, phthalic acid derivatives, trimellitate esters, benzoates, adipate esters, epoxy compounds, phosphate esters, glutarates and mineral oils. On the basis of their molecular weight, plasticizers are further classified as "monomeric" or "polymeric". In comparison with monomeric plasticizers, polymeric plasticizers generally tend to show higher permanence, lower compatibility, and lower plasticization efficiency. Plasticizers are also classed as "primary", and having high compatibility with a particular polymer, or "secondary" if they have lower compatibility. Mixtures of the two types of plasticizers can be employed to achieve cost/performance balances. Suitable modifiers which can be employed herein as the plasticizer component (C) include at least one plasticizer selected from the group consisting of phthalate esters, trimellitate esters, benzoates, adipate esters, epoxy compounds, phosphate esters (triaryl, trialkyl, mixed alkyl aryl phosphates), glutarates and oils.

Particularly suitable phthalate esters include, for example, dialkyl C4–C18 phthalate esters such as diethyl, dibutyl phthalate, diisobutyl phthalate, butyl 2-ethylhexyl phthalate, dioctyl phthalate, diisooctyl phthalate, dinonyl phthalate, diisononyl phthalate, didecyl phthalate, diisodecyl phthalate, diundecyl phthalate, mixed aliphatic esters such as heptyl nonyl phthalate, di(n-hexyl, n-octyl, n-decyl) phthalate (P610), di(n-octyl, n-decyl) phthalate (P810), and aromatic phthalate esters such as diphenyl phthalate ester, or mixed aliphatic-aromatic esters such as benzyl butyl phthalate or any combination thereof and the like.

Additives

Additives such as antioxidants (e.g., hindered phenols such as, for example, Irganox® 1010), phosphites (e.g., Irgafos® 168)), U.V. stabilizers, cling additives (e.g., polyisobutylene), antiblock additives, colorants, pigments, fillers, and the like can also be included in the interpolymers employed in the blends of and/or employed in the present invention, to the extent that they do not interfere with the enhanced properties discovered by Applicants.

The additives are employed in functionally equivalent amounts known to those skilled in the art. For example, the amount of antioxidant employed is that amount which prevents the polymer or polymer blend from undergoing oxidation at the temperatures and environment employed during storage and ultimate use of the polymers. Such amount of antioxidants is usually in the range of from 0.01 to 10, preferably from 0.05 to 5, more preferably from 0.1 to 2 percent by weight based upon the weight of the polymer or polymer blend. Similarly, the amounts of any of the other enumerated additives are the functionally equivalent amounts such as the amount to render the polymer or polymer blend antiblocking, to produce the desired amount of filler loading to produce the desired result, to provide the desired color from the colorant or pigment. Such additives can suitably be employed in the range of from 0.05 to 50, preferably from 0.1 to 35, more preferably from 0.2 to 20 percent by weight based upon the weight of the polymer or polymer blend. However, in the instance of fillers, they could be employed in amounts up to 90 percent by weight based on the weight of the polymer or polymer blend. Additives such as fillers also play a role in the aesthetics of a final article providing a gloss or matte finish.

The Final Blend Compositions

The compositions of the present invention are prepared by any convenient method, including dry blending the individual components and subsequently melt mixing or melt compounding, either directly in the extruder or mill used to make the finished article (e.g., the automotive part), or by pre-melt mixing in a separate extruder or mill (e.g., a Banbury mixer).

There are many types of molding operations which can be used to form useful fabricated articles or parts from the present compositions, including thermoforming and various injection molding processes (e.g., that described in Modern Plastics Encyclopedia/89, Mid October 1988 Issue, Volume 65, Number 11, pp. 264–268, "Introduction to Injection Molding" and on pp. 270–271, "Injection Molding Thermoplastics", the disclosures of which are incorporated herein by reference) and blow molding processes (e.g., that described in Modern Plastics Encyclopedia/89, Mid October 1988 Issue, Volume 65, Number 11, pp. 217–218, "Extrusion-Blow Molding", the disclosure of which is incorporated herein by reference) and profile extrusion. Also included are direct blending and final part formation in a single melt processing operation to fabricate, for example, sheets and films. Some of the fabricated articles include sports articles, containers such as for food or other household articles, footwear, and automotive articles, such as soft facia. The compositions of the present invention, in combination with the final part forming operation, can be selected to control part aesthetics such as a gloss or matte appearance.

The compositions of the present invention can also find utility as so called plastisols or pastes, in which the polymer components are dispersed in a fluid consisting of the plasticizer. Additional components such as viscosity modifiers, diluents or thickeners are often employed to control rheology. Final formulations may also include stabilizers and fillers such as calcium carbonate, clays, kieselguhr, barytes, silica, mica and talc to control properties and aesthetics. These plastisols or pastes find utility in a range of applications including, but not limited to shaped articles such as toys, gaskets, films and sheets, as coatings on polymeric substrates, paper, leather, cloth, and inorganic building materials, and as foams for heat, sound, and vibration damping. Plastisols can be applied by processes such as dip coating, rotational casting, spray systems and hand molding.

Properties of the Individual Blend Components and the Final Blend Compositions a) The Ethylene/Hindered Vinylidene Interpolymers The interpolymers of one or more α-olefins and one or more monovinylidene aromatic monomers and/or one or more hindered aliphatic or cycloaliphatic vinylidene monomers employed in the present invention are substantially random polymers. These interpolymers usually contain from about 0.5 to about 65, preferably from about 1 to about 55, more preferably from about 2 to about 50 mole percent of at least one vinylidene aromatic monomer and/or hindered aliphatic or cycloaliphatic vinylidene monomer and from about 35 to about 99.5, preferably from about 45 to about 99, more preferably from about 50 to about 98 mole percent of at least one aliphatic α-olefin having from 2 to about 20 carbon atoms.

The number average molecular weight ($M_n$) of these interpolymers is usually greater than about 1,000, preferably from about 5,000 to about 1,000,000, more preferably from about 10,000 to about 500,000.

The interpolymer(s) applicable to the present invention can have a melt index ($I_2$) of from about 0.01 to about 1000, preferably of from about 0.1 to about 100, more preferably of from about 0.5 to about 30 g/10 min.

The polydispersity ratio $M_w/M_n$ of the interpolymer(s) applicable to the present invention is from about 1.5 to about 20, preferably of from about 1.8 to about 10, more preferably of from about 2 to about 5.

While preparing the substantially random interpolymer, an amount of homopolymer may be formed, for example, due to homopolymerization of the vinylidene aromatic monomer at elevated temperatures. The presence of vinylidene aromatic homopolymer is in general not detrimental for the purposes of the present invention and can be tolerated. The vinylidene aromatic homopolymer may be separated from the interpolymer, if desired, by extraction techniques such as selective precipitation from solution with a non solvent for either the interpolymer or the vinylidene aromatic homopolymer. For the purpose of the present invention it is preferred that no more than 20 weight percent, preferably less than 15 weight percent based on the total weight of the interpolymers of atactic vinylidene aromatic homopolymer is present.

b) The Vinyl Halide Polymer

Blends were prepared using both flexible and rigid PVC. For the blends containing flexible PVC, samples of 55 and 80 Shore A hardness were prepared. The molecular weight of PVC is commonly expressed in terms of the K value or viscosity number which generally spans from 50 to about 80. The molecular weight increases with increasing K value. Typical MWD ($M_w/M_n$) for PVC are about 2.0 to 2.5. The following table shows the correlation between K value and Mn.

| K | $M_n$ |
|---|---|
| 50 | ~28,000 |
| 80 | ~80,000 | c) The Final Blend Compositions

The blends comprise of from about 1 to about 99 wt % of at least one substantially random interpolymer, preferably of from about 5 to about 95 wt %, more preferably of from about 10 to about 90 wt %.

The blends further comprise 1–99 wt % of at least one vinyl chloride polymer, preferably of from about 5 to about 95 wt %, more preferably of from about 10 to about 90 wt %.

The blends further comprise 0–70 wt. % of at least one plasticizer, preferably of from about 5 to about 50 wt %, more preferably of from about 10 to about 40 wt %.

The following examples are illustrative of the invention, but are not to be construed as to limiting the scope thereof in any manner.

EXAMPLES

Test Methods a) Density and Melt Flow Measurements:

The density of the polymer compositions for use in the present invention was measured in accordance with ASTM D-792. The molecular weight of the polymer compositions for use in the present invention is conveniently indicated using a melt index measurement determined according to ASTM D-1238, Condition 190° C./2.16 kg (formally known as "Condition (E)" and also known as $I_2$).

b) $^{13}$C-NMR Chemical Shifts:

In order to determine the carbon$^{-13}$ NMR chemical shifts of the interpolymers described, the following procedures and conditions are employed. A five to ten weight percent polymer solution is prepared in a mixture consisting of 50 volume percent 1,1,2,2-tetrachloroethane-$d_2$ and 50 volume percent 0.10 molar chromium tris(acetylacetonate) in 1,2,4-trichlorobenzene. NMR spectra are acquired at 130° C. using an inverse gated decoupling sequence, a 90° pulse width and a pulse delay of five seconds or more. The spectra are referenced to the isolated methylene signal of the polymer assigned at 30,000 ppm.

c) Part Preparation and Testing Procedures:

The P610 plasticizer was obtained from C. P. Hall: P610 is a mixed linear dialkyl (hexyl, octyl, decyl) phthalate ester having a molecular weight of about 400.

d) Compression molding:

Samples were melted at 190° C. for 3 min and compression molded at 190° C. under 20,000 lb of pressure for another 2 min. Subsequently, the molten materials were quenched in a press equilibrated at room temperature.

e) Differential Scanning Calorimetry (DSC):

A DuPont DSC-2210 was used to measure the thermal transition temperatures and heat of transition for the samples. In order to eliminate previous thermal history, samples were first heated to about 160° C. Heating and cooling curves were recorded at 10° C./min. Melting ($t_m$ from second heat) and crystallization ($t_c$) temperatures were recorded from the peak temperatures of the endotherm and exotherm, respectively.

f) Dynamic Mechanical Spectroscopy (DMS):

Dynamic mechanical properties of compression molded samples were monitored using a Rheometrics 800E mechanical spectrometer. Samples were run in solid state torsional rectangular geometry and purged under nitrogen to prevent thermal degradation. Generally, the sample was cooled to −100° C. and a strain of 0.05% was applied. Oscillation frequency was fixed at 10 rad/sec and the temperature was ramped in 5° C. increments.

g) Mechanical Testing:

Tensile properties of the compression molded samples were measured using an Instron 1145 tensile machine. ASTM-D638 (microtensile) samples were tested at a crosshead speed of 5 in/min. The data given was the average of four tensile measurements. The standard deviation for the ultimate properties was typically about 10% of the reported average value. The yield stress at the inflection point of the stress strain curve ($\sigma_y$, MPa) was measured as was the Ultimate Tensile stress at break ($\sigma_b$, MPa) and the Young's Modulus (E, MPa).

h) Tensile stress relaxation:

Uniaxial tensile stress relaxation was evaluated using an Instron 1145 tensile machine. Compression molded film (~20 mil thick) with a 10 mil gauge length was deformed to a strain level of 50% at a strain rate of 20 min$^{-1}$. The force required to maintain 50% elongation was monitored for 10 min. The magnitude of the stress relaxation is defined as Sr, the percentage=$(f_i-f_f/f_i)\times 100$ where $f_i$ is the initial force and $f_f$ is the final force.

i) Thermal Mechanical Analysis:

Upper service temperature (TMA(1 mm)) was determined from thermal mechanical analyzer (Perkin Elmer TMA 7 series) scanned at 5° C./min and a load of 1 Newton and defined as the point at which the probe penetrates 1 mm into the sample.

The Individual Blend Components

Preparation of ESI #1

ESI #1 is a substantially random ethylene styrene interpolymer containing 74 wt % styrene, and 26 wt % ethylene (based on the weight of the substantially random ethylene styrene interpolymer) and 9 wt % atactic polystyrene (based on the combined weight of the substantially random ethylene styrene interpolymer and the atactic polystyrene). The interpolymer was prepared in a 400 gallon agitated semi-continuous batch reactor. The reaction mixture consisted of approximately 250 gallons of a solvent comprising a mixture of cyclohexane (85 wt %) & isopentane (15 wt %), and styrene. Prior to addition, solvent, styrene and ethylene were purified to remove water and oxygen. The inhibitor in the styrene was also removed. Inerts were removed by purging the vessel with ethylene. The vessel was then pressure controlled to a set point with ethylene. Hydrogen was added to control molecular weight. Temperature in the vessel was controlled to set-point by varying the jacket water temperature on the vessel. Prior to polymerization, the vessel was heated to the desired run temperature and the catalyst components: titanium: (N- 1,1-dimethylethyl)-dimethyl(1-(1,2,3,4,5-eta)-2,3,4,5-tetramethyl-2,4-cyclopentadien-1-yl) silanaminato))(2-)N)-dimethyl, (CAS# 135072-62-7), tris (pentafluorophenyl)boron, (CAS# 001109-15-5), and modified methylaluminoxane Type 3A, (CAS# 146905-79-5), were flow controlled, (on a mole ratio basis of 1/3/5 respectively), combined, and added to the vessel. After starting, the polymerization was allowed to proceed with ethylene supplied to the reactor as required to maintain vessel pressure. In some cases, hydrogen was added to the headspace of the reactor to maintain a mole ratio with respect to the ethylene concentration. At the end of the run, the catalyst flow was stopped, ethylene was removed from the reactor, about 1000 ppm of Irganox* 1010 anti-oxidant was then added to the solution and the polymer was isolated from solution by either stripping with steam in a vessel or by use of a devolatilizing extruder. In the case of the steam stripped material, additional processing was required in extruder like equipment to reduce residual moisture and any unreacted styrene.

Preparation of ESI #2

ESI #2 is a substantially random ethylene styrene interpolymer containing 27 wt % styrene, and 73 wt % ethylene (based on the weight of the substantially random ethylene styrene interpolymer) and 1 wt % atactic polystyrene (based on the combined weight of the substantially random ethylene styrene interpolymer and the atactic polystyrene) prepared essentially as for ESI #1 using the conditions in Table 1.

TABLE 1

| Single Component | Solvent loaded lbs | Solvent loaded kg | Styrene loaded lbs | Styrene loaded kg | Pressure Psig | Pressure kPa | Temp. ° C. | H$_2$ Added Grams | Run Time Hours | Polymer in Solution Wt. % | Melt Index | Total Wt % Styrene in Polymer | Talc Level Wt % | Isolation Method |
|---|---|---|---|---|---|---|---|---|---|---|---|---|---|---|
| ESI #1 | 252 | 114 | 1320 | 599 | 42 | 290 | 60 | 0 | 2.8 | 11.5 | 0.18 | 81.7 | <2.5 | Stm. Str. |
| ESI #2 | 1196 | 542 | 225 | 102 | 70 | 483 | 60 | 7.5 | 6.1 | 7.2 | 0.03 | 29.8 | 0 | Extruder |

Preparation of ESI #3

ESI #3 is a substantially random ethylene styrene interpolymer containing 73 wt % styrene and 27 wt % ethylene (based on the weight of the substantially random ethylene styrene interpolymer) and 9 wt % atactic polystyrene (based on the combined weight of the substantially random ethylene styrene interpolymer and the atactic polystyrene) prepared as described below, using the conditions in Table 2. Catalyst (dimethyl[N-(1,1-dimethylethyl)-1,1-dimethyl-1-[(1,2,3,4,5-η)-1,5,6,7-tetrahydro-3-phenyl-s-indacen-1-yl] silanaminato(2-)-N]- titanium) Preparation.

Preparation of 3,5,6,7-Tetrahydro-s-Hydrindacen-1(2H)-one.

Indan (94.00 g, 0.7954 moles) and 3-chloropropionyl chloride (100.99 g, 0.7954 moles) were stirred in CH$_2$Cl$_2$ (300 mL) at 0° C. as AlCl₃ (130.00 g, 0.9750 moles) was added slowly under a nitrogen flow. The mixture was then allowed to stir at room temperature for 2 hours. The volatiles were then removed. The mixture was then cooled to 0° C. and concentrated H₂SO₄ (500 mL) slowly added. The forming solid had to be frequently broken up with a spatula as stirring was lost early in this step. The mixture was then left under nitrogen overnight at room temperature. The mixture was then heated until the temperature readings reached 90° C. These conditions were maintained for a 2 hour period of time during which a spatula was periodically used to stir the mixture. After the reaction period crushed ice was placed in the mixture and moved around. The mixture was then transferred to a beaker and washed intermittently with H₂O and diethylether and then the fractions filtered and combined. The mixture was washed with H₂O (2×200 mL). The organic layer was then separated and the volatiles removed. The desired product was then isolated via recrystallization from hexane at 0° C. as pale yellow crystals (22.36 g, 16.3% yield).

¹H NMR (CDCl₃): d2.04–2.19 (m, 2 H), 2.65 (t, $^3J_{HH}$=5.7 Hz, 2 H), 2.84–3.0 (m, 4 H), 3.03 (t, $^3J_{HH}$=5.5 Hz, 2 H), 7.26 (s, 1 H), 7.53 (s, 1 H).

¹³C NMR (CDCl₃): d25.71, 26.01, 32.19, 33.24, 36.93, 118.90, 122.16, 135.88, 144.06, 152.89, 154.36, 206.50. GC-MS: Calculated for C₁₂H₁₂O 172.09, found 172.05.

Preparation of 1,2,3,5-Tetrahydro-7-phenyl-s-indacen.

3,5,6,7-Tetrahydro-s-Hydrindacen-1(2H)-one (12.00 g, 0.06967 moles) was stirred in diethylether (200 mL) at 0° C. as PhMgBr (0.105 moles, 35.00 mL of 3.0 M solution in diethylether) was added slowly. This mixture was then allowed to stir overnight at room temperature. After the reaction period the mixture was quenched by pouring over ice. The mixture was then acidified (pH=1) with HCl and stirred vigorously for 2 hours. The organic layer was then separated and washed with H₂O (2×100 mL) and then dried over MgSO₄. Filtration followed by the removal of the volatiles resulted in the isolation of the desired product as a dark oil (14.68 g, 90.3% yield). ¹H NMR (CDCl₃): d2.0–2.2 (m, 2 H), 2.8–3.1 (m, 4 H), 6.54 (s, 1H), 7.2–7.6 (m, 7 H). GC-MS: Calculated for C₁₈H₁₆ 232.13, found 232.05.

Preparation of 1,2,3,5-Tetrahydro-7-phenyl-s-indacene, dilithium salt.

1,2,3,5-Tetrahydro-7-phenyl-s-indacen (14.68 g, 0.06291 moles) was stirred in hexane (150 mL) as nBuLi (0.080 moles, 40.00 mL of 2.0 M solution in cyclohexane) was slowly added. This mixture was then allowed to stir overnight. After the reaction period the solid was collected via suction filtration as a yellow solid which was washed with hexane, dried under vacuum, and used without further purification or analysis (12.2075 g, 81.1% yield).

Preparation of Chlorodimethyl(1,5,6,7-tetrahydro-3-phenyl-s-indacen-1-yl)silane.

1,2,3,5-Tetrahydro-7-phenyl-s-indacene, dilithium salt (12.2075 g, 0.05102 moles) in THF (50 mL) was added dropwise to a solution of Me₂SiCl₂ (19.5010 g, 0.1511 moles) in THF (100 mL) at 0° C. This mixture was then allowed to stir at room temperature overnight. After the reaction period the volatiles were removed and the residue extracted and filtered using hexane. The removal of the hexane resulted in the isolation of the desired product as a yellow oil (15.1492 g, 91.1% yield).

¹H NMR (CDCl₃): d0.33 (s, 3 H), 0.38 (s, 3 H), 2.20 (p, $^3J_{HH}$=7.5 Hz, 2 H), 2.9–3.1 (m, 4 H), 3.84 (s, 1 H), 6.69 (d, $^3J_{HH}$=2.8 Hz, 1 H), 7.3–7.6 (m, 7 H), 7.68 (d, $^3J_{HH}$=7.4 Hz, 2 H); ¹³C NMR (CDCl₃): d0.24, 0.38, 26.28, 33.05, 33.18, 46.13, 116.42, 119.71, 127.51, 128.33, 128.64, 129.56, 136.51, 141.31, 141.86, 142.17, 142.41, 144.62. GC-MS: Calculated for C₂₀H₂₁ClSi 324.11, found 324.05.

Preparation of N-(1,1-Dimethylethyl)-1,1-dimethyl-1-(1,5,6,7-tetrahydro-3-phenyl-s-indacen-1-yl)silanamine.

Chlorodimethyl(1,5,6,7-tetrahydro-3-phenyl-s-indacen-1-yl)silane (10.8277 g, 0.03322 moles) was stirred in hexane (150 mL) as NEt₃ (3.5123 g, 0.03471 moles) and t-butylamine (2.6074 g, 0.03565 moles) were added. This mixture was allowed to stir for 24 hours. After the reaction period the mixture was filtered and the volatiles removed resulting in the isolation of the desired product as a thick red-yellow oil (10.6551 g, 88.7% yield).

¹H NMR (CDCl₃): d0.02 (s, 3 H), 0.04 (s, 3 H), 1.27 (s, 9 H), 2.16 (p, $^3J_{HH}$=7.2 Hz, 2 H), 2.9–3.0 (m, 4 H), 3.68 (s, 1 H), 6.69 (s, 1 H), 7.3–7.5 (m, 4 H), 7.63 (d, $^3J_{HH}$=7.4 Hz, 2 H); ¹³C NMR (CDCl₃): d-0.32, –0.09, 26.28, 33.39, 34.11, 46.46, 47.54, 49.81, 115.80, 119.30, 126.92, 127.89, 128.46, 132.99, 137.30, 140.20, 140.81, 141.64, 142.08, 144.83.

Preparation of N-(1,1-Dimethylethyl)-1,1-dimethyl-1-(1,5,6,7-tetrahydro-3-phenyl-s-indacen-1-yl)silanamine, dilithium salt.

N-(1,1-Dimethylethyl)-1,1-dimethyl-1-(1,5,6,7-tetrahydro-3-phenyl-s-indacen-1-yl)silanamine (10.6551 g, 0.02947 moles) was stirred in hexane (100 mL) as nBuLi (0.070 moles, 35.00 mL of 2.0 M solution in cyclohexane) was added slowly. This mixture was then allowed to stir overnight during which time no salts crashed out of the dark red solution. After the reaction period the volatiles were removed and the residue quickly washed with hexane (2×50 mL). The dark red residue was then pumped dry and used without further purification or analysis (9.6517 g, 87.7% yield).

Preparation of Dichloro[N-(1,1-dimethylethyl)-1,1-dimethyl-1-[(1,2,3,4,5-η)-1,5,6,7-tetrahydro-3-phenyl-s-indacen-1-yl]silanaminato(2-)-N]titanium.

N-(1,1-Dimethylethyl)-1,1-dimethyl-1-(1,5,6,7-tetrahydro-3-pheny-s-indacen-1-yl)silanamine, dilithium salt (4.5355 g, 0.01214 moles) in THF (50 mL) was added dropwise to a slurry of TiCl₃(THF)₃ (4.5005 g, 0.01214 moles) in THF (100 mL). This mixture was allowed to stir for 2 hours. PbCl₂ (1.7136 g, 0.006162 moles) was then added and the mixture allowed to stir for an additional hour. After the reaction period the volatiles were removed and the residue extracted and filtered using toluene. Removal of the toluene resulted in the isolation of a dark residue. This residue was then slurried in hexane and cooled to 0° C. The desired product was then isolated via filtration as a red-brown crystalline solid (2.5280 g, 43.5% yield).

¹H NMR (CDCl₃): d0.71 (s, 3 H), 0.97 (s, 3 H), 1.37 (s, 9 H), 2.0–2.2 (m, 2 H), 2.9–3.2 (m, 4 H), 6.62 (s, 1 H), 7.35–7.45 (m, 1 H), 7.50 (t, $^3J_{HH}$=7.8 Hz, 2 H), 7.57 (s, 1 H), 7.70 (d, $^3J_{HH}$=7.1 Hz, 2 H), 7.78 (s, 1 H); ¹H NMR (C₆D₆): d0.44 (s, 3 H), 0.68 (s, 3 H), 1.35 (s, 9 H), 1.6–1.9 (m, 2 H), 2.5–3.9 (m, 4 H), 6.65 (s, 1 H), 7.1–7.2 (m, 1 H), 7.24 (t, $^3J_{HH}$=7.1 Hz, 2 H), 7.61 (s, 1 H), 7.69 (s, 1 H), 7.77–7.8 (m, 2 H); ¹³C NMR (CDCl₃): d1.29, 3.89, 26.47, 32.62, 32.84, 32.92, 63.16, 98.25, 118.70, 121.75, 125.62, 128.46, 128.55, 128.79, 129.01, 134.11, 134.53, 136.04, 146.15, 148.93; ¹³C NMR (C₆D₆): d0.90, 3.57, 26.46, 32.56, 32.78, 62.88, 98.14, 119.19, 121.97, 125.84, 127.15, 128.83, 129.03, 129.55, 134.57, 135.04, 136.41, 136.51, 147.24, 148.96.

Preparation of Dimethyl[N-(1,1-dimethylethyl)-1,1-dimethyl-1-[(1,2,3,4,5-η)-1,5,6,7-tetrahydro-3-phenyl-s-indacen-1-yl]silanaminato(2-)-N]titanium.

Dichloro[N-(1,1-dimethylethyl)-1,1-dimethyl-1-[(1,2,3,4,5-η)-1,5,6,7-tetrahydro-3-phenyl-s-indacen-1-yl]silanaminato(2-)-N]titanium (0.4970 g, 0.001039 moles)

was stirred in diethylether (50 mL) as MeMgBr (0.0021 moles, 0.70 mL of 3.0 M solution in diethylether) was added slowly. This mixture was then stirred for 1 hour. After the reaction period the volatiles were removed and the residue extracted and filtered using hexane. Removal of the hexane resulted in the isolation of the desired product as a golden yellow solid (0.4546 g, 66.7% yield).

$^1$H NMR (C$_6$D$_6$): d0.071 (s, 3 H), 0.49 (s, 3 H), 0.70 (s, 3 H), 0.73 (s, 3 H), 1.49 (s, 9 H), 1.7–1.8 (m, 2 H), 2.5–2.8 (m, 4 H), 6.41 (s, 1 H), 7.29 (t, $^3J_{HH}$=7.4 Hz, 2 H), 7.48 (s, 1 H), 7.72 (d, $^3J_{HH}$=7.4 Hz, 2 H), 7.92 (s, 1 H); $^{13}$C NMR (C$_6$D$_6$): d2.19, 4.61, 27.12, 32.86, 33.00, 34.73, 58.68, 58.82, 118.62, 121.98, 124.26, 127.32, 128.63, 128.98, 131.23, 134.39, 136.38, 143.19, 144.85.

Cocatalyst (bis(hydrogenated-tallowalkyl)methylamine) (B-FABA) Preparation.

Methylcyclohexane (1200 mL) was placed in a 2 L cylindrical flask. While stirring, bis(hydrogenated-tallowalkyl)methylamine (ARMEEN® M2HT, 104 g, ground to a granular form) was added to the flask and stirred until completely dissolved. Aqueous HCl (1M, 200 mL) was added to the flask, and the mixture was stirred for 30 minutes. A white precipitate formed immediately. At the end of this time, LiB(C$_6$F$_5$)$_4$·Et$_2$O·3 LiCl (Mw=887.3; 177.4 g) was added to the flask. The solution began to turn milky white. The flask was equipped with a 6" Vigreux column topped with a distillation apparatus and the mixture was heated (140° C. external wall temperature). A mixture of ether and methylcyclohexane was distilled from the flask. The two-phase solution was now only slightly hazy. The mixture was allowed to cool to room temperature, and the contents were placed in a 4 L separatory funnel. The aqueous layer was removed and discarded, and the organic layer was washed twice with H$_2$O and the aqueous layers again discarded. The H$_2$O saturated methylcyclohexane solutions were measured to contain 0.48 wt percent diethyl ether (Et$_2$O). The solution (600 mL) was transferred into a 1 L flask, sparged thoroughly with nitrogen, and transferred into the drybox. The solution was passed through a column (1" diameter, 6" height) containing 13× molecular sieves. This reduced the level of Et$_2$O from 0.48 wt percent to 0.28 wt percent. The material was then stirred over fresh 13× sieves (20 g) for four hours. The Et$_2$O level was then measured to be 0.19 wt percent. The mixture was then stirred overnight, resulting in a further reduction in Et$_2$O level to approximately 40 ppm. The mixture was filtered using a funnel equipped with a glass frit having a pore size of 10–15 μm to give a clear solution (the molecular sieves were rinsed with additional dry methylcyclohexane). The concentration was measured by gravimetric analysis yielding a value of 16.7 wt percent.

Polymerization

ESI #3 was prepared in a 6 gallon (22.7 L), oil jacketed, Autoclave continuously stirred tank reactor (CSTR). A magnetically coupled agitator with Lightning A-320 impellers provided the mixing. The reactor ran liquid full at 475 psig (3,275 kPa). Process flow was in at the bottom and out of the top. A heat transfer oil was circulated through the jacket of the reactor to remove some of the heat of reaction. At the exit of the reactor was a micromotion flow meter that measured flow and solution density. All lines on the exit of the reactor were traced with 50 psi (344.7 kPa) steam and insulated.

Ethylbenzene solvent was supplied to the reactor at 30 psig (207 kPa). The feed to the reactor was measured by a Micro-Motion mass flow meter. A variable speed diaphragm pump controlled the feed rate. At the discharge of the solvent pump, a side stream was taken to provide flush flows for the catalyst injection line (1 lb/hr (0.45 kg/hr)) and the reactor agitator (0.75 lb/hr (0.34 kg/hr)). These flows were measured by differential pressure flow meters and controlled by manual adjustment of micro-flow needle valves. Uninhibited styrene monomer was supplied to the reactor at 30 psig (207 kpa). The feed to the reactor was measured by a Micro-Motion mass flow meter. A variable speed diaphragm pump controlled the feed rate. The styrene streams was mixed with the remaining solvent stream. Ethylene was supplied to the reactor at 600 psig (4,137 kPa). The ethylene stream was measured by a Micro-Motion mass flow meter just prior to the Research valve controlling flow. A Brooks flow meter/controller was used to deliver hydrogen into the ethylene stream at the outlet of the ethylene control valve. The ethylene/hydrogen mixture combines with the solvent/styrene stream at ambient temperature. The temperature of the solvent/monomer as it enters the reactor was dropped to ~5° C. by an exchanger with −5° C. glycol on the jacket. This stream entered the bottom of the reactor. The three component catalyst system and its solvent flush also entered the reactor at the bottom but through a different port than the monomer stream. Preparation of the catalyst components took place in an inert atmosphere glove box. The diluted components were put in nitrogen padded cylinders and charged to the catalyst run tanks in the process area. From these run tanks the catalyst was pressured up with piston pumps and the flow was measured with Micro-Motion mass flow meters. These streams combine with each other and the catalyst flush solvent just prior to entry through a single injection line into the reactor.

Polymerization was stopped with the addition of catalyst kill (water mixed with solvent) into the reactor product line after the micromotion flow meter measuring the solution density. Other polymer additives can be added with the catalyst kill. A static mixer in the line provided dispersion of the catalyst kill and additives in the reactor effluent stream. This stream next entered post reactor heaters that provide additional energy for the solvent removal flash. This flash occurred as the effluent exited the post reactor heater and the pressure was dropped from 475 psig (3,275 kPa) down to ~250 mm of pressure absolute at the reactor pressure control valve. This flashed polymer entered a hot oil jacketed devolatilizer. Approximately 85 percent of the volatiles were removed from the polymer in the devolatilizer. The volatiles exited the top of the devolatilizer. The stream was condensed with a glycol jacketed exchanger and entered the suction of a vacuum pump and was discharged to a glycol jacket solvent and styrene/ethylene separation vessel. Solvent and styrene were removed from the bottom of the vessel and ethylene from the top. The ethylene stream was measured with a Micro-Motion mass flow meter and analyzed for composition. The measurement of vented ethylene plus a calculation of the dissolved gasses in the solvent/styrene stream were used to calculate the ethylene conversion. The polymer separated in the devolatilizer was pumped out with a gear pump to a ZSK-30 devolatilizing vacuum extruder. The dry polymer exits the extruder as a single strand. This strand was cooled as it was pulled through a water bath. The excess water was blown from the strand with air and the strand was chopped into pellets with a strand chopper.

Preparation of ESI #4

ESI #4 is a substantially random ethylene styrene interpolymer containing 72 wt % styrene, and 28 wt % ethylene (based on the weight of the substantially random ethylene styrene interpolymer) and 3 wt % atactic polystyrene (based on the combined weight of the substantially random ethylene styrene interpolymer and the atactic polystyrene) prepared essentially as for ESI #3 using the conditions in Table 2.

Preparation of ESI #5

ESI #5 is a substantially random ethylene styrene interpolymer containing 57 wt % styrene, and 43 wt % ethylene (based on the weight of the substantially random ethylene styrene interpolymer) and 3 wt % atactic polystyrene (based on the combined weight of the substantially random ethylene styrene interpolymer and the atactic polystyrene) prepared essentially as for ESI #3 using the conditions in Table 2.

Preparation of ESI #6

ESI #6 is a substantially random ethylene styrene interpolymer containing 20 wt % styrene, and 80 wt % ethylene (based on the weight of the substantially random ethylene styrene interpolymer) and 8 wt % atactic polystyrene (based on the combined weight of the substantially random ethylene styrene interpolymer and the atactic polystyrene) prepared essentially as for ESI #3 using the conditions in Table 2.

PVC #1 was a flexible PVC obtained from and having the registered trademark Geon 80™ of the supplier, the BF Goodrich Company. The Shore A Hardness of this material was 80.

PCV #2

PVC #2 was also a flexible PVC obtained from, and having the registered trademark Geon 55™ of, the supplier, the BF Goodrich Company. The Shore A Hardness of this material was 55.

RPCV #1

RPVC #1 was a rigid PVC obtained from, and having the registered trademark M1000™ of, the supplier, the BF Goodrich Company.

The various catalysts, co-catalysts and process conditions used to prepare the various individual ethylene styrene interpolymers for use in the blend compositions of the present invention are summarized in Table 2.

TABLE 2

| Sample # | Reactor Temp C. | Solvent Flow lb/hr | Ethylene Flow lb/hr | Hydrogen Flow lb/hr | Styrene Flow lb/hr | % Conversion | Catalyst | Co-Catalyst | B/Ti Ratio | MMAO$^e$/Ti Ratio |
|---|---|---|---|---|---|---|---|---|---|---|
| ESI #3 | 61.4 | 19.2 | 1.0 | 5 | 20.0 | 84.9 | a | B-FABA | 1.25 | 10 |
| ESI #4 | 76.9 | 26.0 | 1.1 | 0 | 9.7 | 96.2 | a | FAB$^d$ | 2.99 | 7 |
| ESI #5 | 80.2 | 18.6 | 1.7 | 12 | 12.0 | 86.1 | a | B-FABA$^c$ | 1.25 | 10 |
| ESI #6 | 108.9 | 26.6 | 3.0 | 5 | 9.0 | 89.9 | b | B-FABA$^c$ | 1.24 | 6 |
| ESI #7 | 109.7 | 30.7 | 3.5 | 5 | 9.3 | 88.9 | b | B-FABA$^c$ | 1.25 | 6 |
| ESI #8 | 80.1 | 18.6 | 1.7 | 12 | 12.0 | 87.4 | a | B-FABA$^c$ | 1.25 | 10 |
| ESI #9 | 61.2 | 19.2 | 1.0 | 5 | 20.0 | 85.7 | a | B-FABA$^c$ | 1.25 | 10 |

$^a$catalyst is dimethyl[N-(1,1-dimethylethyl)-1,1-dimethyl-1-[(1,2,3,4,5-η)-1,5,6,7-tetrahydro-3-phenyl-s-indacen-1-yl]silaneaminato(2-)-N]-titanium.
$^b$catalyst is (t-butylamido)dimethyl(tetramethylcyclopentadienyl)silane-titanium (II) 1,3-pentadiene prepared as described in U.S. Pat. No. 5,556,928, Example 17
$^c$BFABA is bis-hydrogenated tallowalkyl methylammonium tetrakis (pentafluorophenyl)borate.
$^d$FAB is tris(pentafluorophenyl)borane.
$^e$a modified methylaluminoxane commercially available from Akzo Nobel as MMAO-3A.
$^f$CGC-1 is titanium: (N-1,1-dimethylethyl)-dimethyl(1-(1,2,3,4,5-η)-2,3,4,5-tetramethyl-2,4-cyclopentadien-1-yl) silanaminato))(2-)N)-dimethyl, CAS #135072-62-7 prepared as decribed in U.S. Pat. No. 5,380,810, Example 1.

Preparation of ESI #7

ESI #7 is a substantially random ethylene styrene interpolymer containing 20 wt % styrene, and 80 wt % ethylene (based on the weight of the substantially random ethylene styrene interpolymer) and 8 wt % atactic polystyrene (based on the combined weight of the substantially random ethylene styrene interpolymer and the atactic polystyrene) prepared essentially as for ESI #3 using the conditions in Table 2.

Preparation of ESI #8

ESI #8 is a substantially random ethylene styrene interpolymer containing 57.7 wt % styrene, and 40 wt % ethylene (based on the weight of the substantially random ethylene styrene interpolymer) and 3.1 wt % atactic polystyrene (based on the combined weight of the substantially random ethylene styrene interpolymer and the atactic polystyrene) prepared essentially as for ESI #3 using the conditions in Table 2.

Preparation of ESI #9

ESI #9 is a substantially random ethylene styrene interpolymer containing 73.3 wt % styrene, and 26.7 wt % ethylene (based on the weight of the substantially random ethylene styrene interpolymer) and 8.6 wt % atactic polystyrene (based on the combined weight of the substantially random ethylene styrene interpolymer and the atactic polystyrene) prepared essentially as for ESI #3 using the conditions in Table 2.

PCV #1

Preparation of the Blends

Example 1

Example 1 is a blend containing 25% by weight of ESI #1 and 75% by weight of PVC #1. The blend was prepared by melt compounding components mixed in the specified weight ratios using a Haake mixer equipped with a Rheomix 3000 bowl, operating at 170° C. and 40 rpm. The capacity of this mixer is 310 cc. Optimum volume for effective mixing is approximately 70% or 220 cc. Calculations were made considering density and constituency of each component to prepare a dry blend of the materials to achieve a 70% volume fill. The dry blended materials were then added stepwise into the preheated calibrated bowl as the rotors were turning at 43 rpm. So as to avoid any decomposition of the flexible PVC, the materials were heated to approximately 160 degrees Centigrade. After a small melt heel was established in the mixer, small increments of dry blend were added and allowed to melt and incorporate into the heel before more blend was added. This continued for approximately three minutes until all the blend was added. A sealing ram was then lowered on to the melt bowl and the melted blend was allowed to mix by roller blade action for an additional ten minutes. At the end of this time the rotors were stopped, the mixer was dismantled, and the melt blend was removed and allowed to cool for further testing and analysis.

Example 2

Example 2 is a blend containing 75% by weight of ESI #1 and 25% by weight of PVC #1. The blend was prepared essentially as for Example 1.

Example 3

Example 3 is a blend containing 50% by weight of ESI #2 and 50% by weight of PVC #1. The blend was prepared essentially as for Example 1.

Example 4

Example 4 is a blend containing 75% by weight of ESI #3 and 25% by weight of PVC #2. The blend was prepared by blending in a Haake Rheomix 3000 bowl mixer. The capacity of this mixer is 310 cc. Optimum volume for effective mixing is approximately 70% or 220 cc. Calculations were made considering density and constituency of each component to prepare a dry blend of the materials to achieve a 70% volume fill. The dry blended materials were then added stepwise into the preheated calibrated bowl as the rotors were turning at 30 rpm. So as to avoid any decomposition of the flexible PVC, the materials were heated to approximately 150 degrees Centigrade. After a small melt heel was established in the mixer, small increments of dry blend were added and allowed to melt and incorporate into the heel before more blend was added. This continued for approximately two minutes until all the blend was added. A sealing ram was then lowered on to the melt bowl and the melted blend was allowed to mix by roller blade action for an additional ten minutes. At the end of this time the rotors were stopped, the mixer was dismantled, and the melt blend was removed and allowed to cool for further testing and analysis.

Example 5

Example 5 is a blend containing 50% by weight of ESI #3 and 50% by weight of PVC #2. The blend was prepared essentially as for Example 4.

Example 6

Example 6 is a blend containing 75% by weight of ESI #4 and 25% by weight of RPVC #1. The blend was prepared on the Haake Micro18 Extruder. This is a twin co-rotating screw extruder with 18 mm screws and an L/D of ~31. A dry blend of the blending materials was fed to the extruder feed throat via a KTRON auger feeder at the rate of approximately four pounds per hour. The extruder was preheated for one hour to the following Zone conditions: 1–135 deg C., 2–165 deg C., 3–165 deg C., 4–165 deg C., 5–175 deg C., and die temp 175 deg C. The extruder was run at 100 rpm. The extrudate having a melt temperature of 160–178 degrees C. was quenched in a water bath dried by air knife and chopped into pellets.

Example 7

Example 7 is a blend containing 50% by weight of ESI #4 and 50% by weight of RPVC #1. The blend was prepared essentially as for Example 6.

Example 8

Example 8 is a blend containing 25% by weight of ESI #4 and 75% by weight of RPVC #1. The blend was prepared essentially as for Example 6.

Example 9

Example 9 is a blend containing 50% by weight of ESI #6 and 50% by weight of RPVC #1. The blend was prepared essentially as for Example 6.

Example 10

Example 10 is a blend containing 50% by weight of ESI #5 and 50% by weight of RPVC #1. The blend was prepared essentially as for Example 6.

Analysis of the various Tg values for these examples in Table 3 shows the surprising result that, although blends of ethylene/styrene interpolymers with rigid PVC #1 (Examples 6–10) have dual broad Tg's due to the immiscibility of the two components, blends of flexible PVC and ethylene/styrene interpolymers can have either a dual broad Tg (as in Example 1) or a single narrow Tg (as in Examples 2–5) simply by varying the relative amounts of the flexible PVC and the ethylene/styrene interpolymer.

In addition, analysis of the $E_b$ values for the blends of Examples 2 and 3 as compared to those of the individual components, demonstrates the synergistic effect of blending on tensile elongation at rupture. Thus Example 2 has an $E_b$ of 375%, which is higher than the $E_b$ values of ESI #1 (282%) or PVC #1 (198%) individual blend components. A synergistic effect on $E_b$ of blending is also observed in Example 3 which has an $E_b$ of 481% which is also greater than the $E_b$ values of ESI #2 (397%) or PVC #1 (198%) individual blend components.

Examples 1, 4 and 5 in Table 3 in addition to showing a similar synergistic effect of blending on Eb also demonstrate that the % stress relaxation (% SR) observed for the blends can also be higher than those observed for the individual blend components, for instance Example 5 has a % SR of 94% which is greater than that of the ESI #3 (92%) or the PVC #2 (56%) individual blend component.

Examples 6–10 in Table 3 are blends of rigid PVC with ethylene/styrene interpolymers. Rigid PVC #1 has a very low $E_b$ value (13%) and essentially exhibits no stress relaxation. ESI #4 has an $E_b$ value of 244% and a % SR of 93%. The blend of Example 6 which contains as high as 25 wt % RPVC #1 is still able to have an $E_b$ of 272% and a % SR of 88%. Increasing the RPVC #1 content to 50% as in Example 7, still results in an $E_b$ of 32%.

TABLE 3

| Single Component | Mixture | Composition (wt % styrene) | $I_2$ g/10 m | E MPa | $\sigma_y$, Psi MPa | $\sigma_b$, Psi MPa | Tg1 °C. | Tg2 °C. | Tm/Xtlty % Xtyl °C./% | $E_b$, % | Sr % | T (1mm), °C. |
|---|---|---|---|---|---|---|---|---|---|---|---|---|
| ESI #1 | Ethylene/Styrene | 74% | 0.20 | 609.7 | 15.2 | 20.2 | 30 | | | 282 | 93 | 81 |
| ESI #2 | Ethylene/Styrene | 27% | 0.03 | 19.9 | 2.7 | 18.5 | −8 | | 71/15 | 397 | 30 | 88 |
| ESI #3 | Ethylene/Styrene | 73% | 2.50 | 582.0 | 15.1 | 15.0 | 31 | | | 265 | 92 | 63 |
| ESI #4 | Ethylene/Styrene | 72% | 1.10 | 215.3 | 4.6 | 13.6 | 30 | | | 244 | 93 | 71 |
| ESI #5 | Ethylene/Styrene | 57% | 1.00 | 3.8 | 1.6 | 1.8 | 4 | | | 956 | 69 | 57 |
| ESI #6 | Ethylene/Styrene | 20% | 1.00 | 26.6 | 5.2 | 30.4 | −7 | | 90/29 | 589 | 31 | 99 |

TABLE 3-continued

| Single Component | Mixture | Composition (wt % styrene) | $I_2$ g/10 m | E MPa | $\sigma_y$, Psi MPa | $\sigma_b$, Psi MPa | Tg1 °C. | Tg2, °C. | Tm/Xtlty % Xtyl °C./% | $E_b$, % | Sr % | T (1mm), °C. |
|---|---|---|---|---|---|---|---|---|---|---|---|---|
| PVC #1 | — | — | | 8.3 | 4.2 | 7.7 | −1 | | | 198 | 71 | 104 |
| PVC #2 | — | — | | 3.4 | 3.6 | 3.6 | −31 | | | 160 | 56 | 85 |
| RPVC #1 | — | — | | 1482.9 | 55.3 | 46.5 | 89 | | | 13 | — | 140 |
| Blends | | | | | | | | | | | | |
| Example 1 | ESI #1/PVC #1 | 25/75 | | 16.7 | 2.1 | 2.6 | −14 | 32(S) | | 129 | 86 | 63 |
| Example 2 | ESI #1/PVC #1 | 75/25 | | 12.7 | 1.5 | 13.6 | 19 | | | 375 | 67 | 70 |
| Example 3 | ESI #2/PVC #1 | 50/50 | | 26.9 | 3.7 | 10.3 | −20 | | 71/18 | 481 | — | 82 |
| Example 4 | ESI #3/PVC #2 | 75/25 | | 3.6 | 1.4 | 1.7 | 11 | | | 708 | 84 | 48 |
| Example 5 | ESI #3/PVC #2 | 50/50 | | 3.8 | 0.7 | 0.01 | −6 | | | 492 | 94 | 43 |
| Example 6 | ESI #4/RPVC #1 | 75/25 | | 222.6 | 5.0 | 17.5 | 29 | 90 | | 272 | 88 | 80 |
| Example 7 | ESI #4/RPVC #1 | 50/50 | | 397.8 | 11.4 | 12.7 | 23 | 91 | | 32 | — | 92 |
| Example 8 | ESI #4/RPVC #1 | 25/75 | | 910.2 | 25.6 | 25.2 | 15 | 92 | | 4 | — | 121 |
| Example 9 | ESI #6/RPVC #1 | 50/50 | | 331.3 | 10.4 | 9.6 | −9 | ** | 89/29 | 9 | — | 101 |
| Example 10 | ESI #5/RPVC #1 | 50/50 | | 142.9 | 5.9 | 7.1 | 2 | 92 | | 38 | — | 83 |

(S)Shoulder.
**Tg Overlaps with Tm

Examples 11–18

Examples 11–18 in Table 4 are blends of ethylene/styrene interpolymers with Rigid PVC, all containing the same amount of P 610 plasticizer (20% by weight). A blend of various styrene containing ESI and RPVC #1 (stabilized pellet form) was prepared along with a plasticizer on the Haake Micro18 Extruder. A dry blend of ESI and RPVC was fed to the extruder via an auger KTRON feeder. The plasticizer was injected in Zone 3 as a liquid using a displacement pump and an injector nozzle. The dry blend feed rate was monitored by weighing timed delivery at the auger tip. The injector system feed rate was monitored by timed weight loss of the plasticizer container. Calibration curves for each of these was used to establish the proper settings for the auger feeder and displacement pump to produce the desired ratio of plasticizer to solids at a total feed rate of approximately 2–2.5 pounds per hour. The Zone temperature settings in degrees Centigrade were as follows: 1–137, 2–170, 3–180, 4–180, 5–180, die-170. The extruder was run at 105 rpm. The resulting extrudate having a melt temperature of 165° C. was water quenched, air knife dried, and chopped into pellets.

Examples 11–13, 14–15, and 16–18 in Table 4, all show how the Tg's of the blends can be varied over a wide range by varying the relative amounts of the ethylene/styrene interpolymer and the Rigid PVC #1. The magnitude of this variation is best demonstrated by comparison of the Tg's of Examples 16–18 with those measured in Comparative Examples 1 and 2 of the binary mixtures of P610 plasticizer and RPVC #1, and P610 plasticizer and ESI #9.

TABLE 4

| Single Components | Mixture | Composition (wt % Styrene) | $I_2$ g/10 m | E MPa | $\sigma_y$, Psi MPa | $\sigma_b$, Psi MPa | Tg1 °C. | Tg2, °C. | Tm/Xtyl °C./% | $E_b$, % | TMA, °C. |
|---|---|---|---|---|---|---|---|---|---|---|---|
| ESI #7 | Ethylene/Styrene | 20.0 | 0.80 | 63.2 | 5.1 | 25.5 | — | — | 91.1/28.6 | 586 | 102 |
| ESI #8 | Ethylene/Styrene | 57.7 | 0.90 | 3.5 | 1.5 | 1.4 | 3.5 | — | — | 1119 | 55 |
| ESI #9 | Ethylene/Styrene | 73.3 | 2.20 | 384.9 | 10.9 | 12.6 | 31.8 | — | — | 187 | 65 |
| RPVC #1 | — | — | | 1482.9 | 55.4 | 46.5 | 89 | — | — | 13 | 140 |
| Blends | | | | | | | | | | | |
| Example 11 | ESI #7/RPVC #1/P61 | 60/20/20 | | 39.5 | 3.9 | 13.5 | −13.9 | 36.4 | 88.9/32.5 | 671 | 95 |
| Example 12 | ESI #7/RPVC #1/P61 | 40/40/20 | | 65.6 | 4.1 | 3.9 | −12.1 | 34.6 | 88.0/36.9 | 123 | 96 |
| Example 13 | ESI #7/RPVC #1/P61 | 20/60/20 | | 147.4 | 6.6 | 8.6 | | 47.1 | 87.6/42.6 | 52 | 105 |
| Example 14 | ESI #8/RPVC #1/P61 | 60/20/20 | | 2.2 | 0.5 | 0.3 | −19.3 | 69.3 | — | 182 | 34 |
| Example 15 | ESI #8/RPVC #1/P61 | 40/40/20 | | 170.3 | 5.3 | 4.4 | −25.4 | 58.5 | — | 17 | 63 |
| Example 16 | ESI #9/RPVC #1/P61 | 60/20/20 | | 2.7 | 0.7 | 0.5 | 1.7 | | — | 180 | 45 |
| Example 17 | ESI #9/RPVC #1/P61 | 40/40/20 | | 162.2 | 4.6 | 4.3 | −8.4 | 58.6 | — | 17 | 74 |
| Example 18 | ESI #9/RPVC #1/P61 | 20/60/20 | | 475.0 | 12.2 | 9.9 | −15.1 | 54.3 | — | 9 | 104 |
| Comp Exp. 1 | RPVC #1/P610 | 75/25 | | 181.1 | 12.3 | 16.2 | — | 48.3 | — | 232 | 116 |
| Comp Exp. 2 | ESI #9/P610 | 75/25 | | 0.7 | 0.3 | 0.1 | — | −3.6 | — | 470 | 43 |

What is claimed is:
1. A blend of polymeric materials comprising
(A) of from about 1 to about 99 weight percent based on the combined weights of Components A, B and C of at least one substantially random interpolymer; and wherein said interpolymer;
 (1) contains of from about 0.5 to about 65 mole percent of polymer units derived from styrene;
 (2) contains of from about 35 to about 99.5 mole percent of polymer units derived from ethylene;
 (3) has a molecular weight (Mn) greater than about 1,000;
 (4) has a melt index ($I_2$ as measured by ASTM D-1238, Condition 190° C./2.16 kg) of from about 0.01 to about 1,000 g/10 min;

(5) has a molecular weight distribution ($M_w/M_n$) of from about 1.5 to about 20; and (B) of from about 99 to about 1 weight percent based on the combined weights of Components A, B, and C of polyvinyl chloride; and (C) of from about 0 to about 70 weight percent based on the combined weights of Components A, B, and C of one or more plasticizers.

2. The blend of claim 1 wherein;

(i) Component A is present in an amount of from about 5 to about 95 weight percent based on the combined weights of Components A, B and C;

(ii) Component A contains of from about 1 to about 55 mole percent of polymer units derived from styrene;

(iii) Component A contains of from about 45 to about 99 mole percent of polymer units derived from ethylene;

(iv) Component A has a molecular weight ($M_n$) of from about 5,000 to about 1,000,000;

(v) Component A has a melt index ($I_2$ as measured by ASTM D-1238, Condition 190° C./2.16 kg) of from about 0.1 to about 100 g/10 min;

(vi) Component A has a molecular weight distribution ($M_w/M_n$) of from about 1.8 to about 10;

(vii) Component B is present in an amount of from about 95 to about 5 weight percent based on the combined weights of components A, B and C and is poly vinyl chloride; and (viii) Component C is present in an amount of from about 5 to about 50 weight percent based on the combined weights of Components A, B and C and is selected from the group consisting of phthalate esters, trimellitate esters, benzoates, adipate esters, epoxy compounds, phosphate esters, glutarates and oils.

3. The blend of claim 1 wherein;

(i) Component A is present in an amount of from about 10 to about 90 weight percent based on the combined weights of components A, B and C;

(ii) Component A contains of from about 2 to about 50 mole percent of polymer units derived from styrene;

(iii) Component A contains of from about 50 to about 98 mole percent of polymer units derived from ethylene;

(iv) Component A has a molecular weight ($M_n$) of from about 10,000 to about 500,000;

(v) Component A has a melt index ($I_2$ as measured by ASTM D-1238, Condition 190° C./2.16 kg) of from about 0.5 to about 30 g/10 min;

(vi) Component A has a molecular weight distribution ($M_w/M_n$) of from about 2 to about 5;

(vii) Component B is present in an amount of from about 90 to about 10 weight percent based on the combined weights of Components A, B and C and is poly vinyl chloride; and (viii) Component C is present in an amount of from about 10 to about 40 weight percent based on the combined weights of Components A, B and C and is further selected from the group consisting of phthalate esters, including dialkyl, mixed linear dialkyl, aryl and mixed alkyl aryl esters.

4. A blend of claim 3 wherein i) said plasticizer, Component C, selected from the group consisting of phthalate esters, including dialkyl, mixed linear dialkyl, aryl and mixed alkyl aryl esters.

5. A blend of claim 1 wherein:

iv) said plasticizer, Component C, is selected from the group consisting of phthalate esters, including dialkyl, mixed linear dialkyl, aryl and mixed alkyl aryl esters.

6. The blend of claim 1 having a single glass transition temperature (Tg) as measured by dynamic mechanical spectroscopy (DMS).

7. The blend of claim 1 having more than one glass transition temperature (Tg) as measured by dynamic mechanical spectroscopy (DMS).

8. A blend of claim 1 wherein Component A is produced by polymerization in the presence of a metallocene or constrained geometry catalyst and a co-catalyst.

9. An article resulting from injection, compression, extrusion or blow molding a blend of claim 1.

10. An article resulting from injection, compression, extrusion or blow molding a blend of claim 2.

11. An article resulting from injection, compression, extrusion or blow molding a blend of claim 3.

12. An article resulting from injection, compression, extrusion or blow molding a blend of claim 4.

13. An article resulting from injection, compression, extrusion or blow molding a blend of claim 5.

14. An article resulting from injection, compression, extrusion or blow molding a blend of claim 6.

15. An article resulting from injection, compression, extrusion or blow molding a blend of claim 7.

16. An article resulting from injection, compression, extrusion or blow molding a blend of claim 8.

* * * * *